Figure 1:
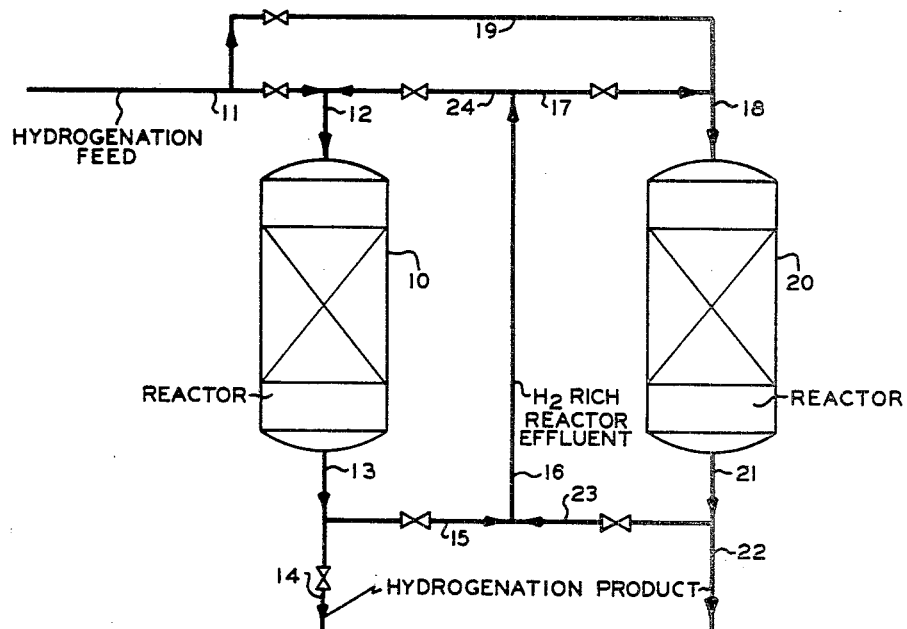

April 21, 1964  C. P. STARK  3,130,240

PROCESS FOR THE ACTIVATION OF HYDROGENATION CATALYSTS

Filed Nov. 16, 1961

INVENTOR.
C. P. STARK

BY *Young & Quigg*

ATTORNEYS

United States Patent Office 3,130,240
Patented Apr. 21, 1964

3,130,240
PROCESS FOR THE ACTIVATION OF
HYDROGENATION CATALYSTS
Christopher P. Stark, Bartlesville, Okla., assignor to Phillips Petroleum Company, a corporation of Delaware
Filed Nov. 16, 1961, Ser. No. 152,799
7 Claims. (Cl. 260—667)

This invention relates to the activation of metal hydrogenation catalysts. In accordance with one aspect, this invention relates to an improved process for activating or reducing metal hydrogenation catalysts, especially nickel-kieselguhr hydrogenation catalysts. In accordance with another aspect, this invention relates to the metal hydrogenation catalysts activated by the present process and to the hydrogenation of hydrocarbons, especially aromatic hydrocarbons, in contact with said catalysts.

In the hydrogenation of unsaturated compounds, and particularly in the hydrogenation of aromatic hydrocarbons, for example benzene, metal catalysts are used. These metal catalysts are usually received from the manufacturer as metal oxide or other compound on a support such as kieselguhr. Because of the extremely active nature of the finely divided metal, e.g. nickel, of the catalyst and its tendency to oxidize in air and thus becoming inactive for hydrogenation, it is necessary that the catalyst be shipped, handled, and loaded into a reactor in the oxidized state and reduced "in situ" in order to render it active for the hydrogenation reaction. This reduction step has been ordinarily carried out in the prior art by employing pure hydrogen as a reducing medium. However, pure hydrogen is extremely expensive to use. Also, in some plant practices, steam is added to impure hydrogen as a diluent to control the temperature rise during reduction of the catalyst. However, this has also been found to be undesirable since the catalyst life is considerably less when employing steam as a diluent compared with a catalyst reduced with commercial pure cylinder hydrogen.

According to the invention, it has been found that various metal hydrogenation catalysts, particularly nickel hydrogenation catalysts, can be activated or reduced prior to use without some of the prior art disadvantages by utilizing the hydrogen-rich effluent products from a hydrogenation reaction as the reducing medium or atmosphere, thereby resulting in a saving of time, labor, money and equipment.

Accordingly, an object of this invention is to provide an improved process for activating hydrogenation catalysts.

Another object of this invention is to provide a novel reducing medium or atmosphere for activating metal hydrogenation catalysts.

Another object of this invention is to provide an active metal hydrogenation catalyst, especially a nickel hydrogenation catalyst, of increased catalyst life.

Other objects, aspects as well as the several advantages of this invention will be apparent to one skilled in the art upon studying this disclosure, the drawings, and the appended claims.

Broadly, according to the invention, an improved process is provided for activating or reducing metal hydrogenation catalysts, such as nickel-kieselguhr hydrogenation catalysts, which comprises contacting the unreduced catalyst at a temperature ranging from about 450 to about 700° F. with a reducing medium comprising the hydrogen-rich product or effluent stream removed from an operating catalytic hydrogenation zone. Many of the prior art disadvantages are obviated when activating or reducing metal hydrogenation catalysts according to the invention.

More specifically, according to the present invention, there are provided a process and apparatus wherein a stream to be hydrogenated is passed consecutively under hydrogenation conditions through a bed of activated hydrogenation catalyst and a bed of unreduced metal hydrogenation catalyst. The activated catalyst and unactivated catalyst are so placed in the apparatus that the hydrogenation effluent passes directly from the activated catalyst bed to the unreduced catalyst bed, preferably without any intermediate or intervening step or treatment such as cooling, etc.

In accordance with one embodiment, the process of the invention is carried out utilizing two reactors in series wherein a bed of activated metal hydrogenation catalyst is utilized in the first reactor and a bed of fresh catalyst in the oxidized state is utilized in the second reactor. The hydrogenation feed, e.g. an aromatic-containing stream and hydrogen, is passed through the first reactor under hydrogenation conditions and the reaction effluent from the hydrogenation bed without added steam is then passed through the inactive oxidized catalyst bed in a second reactor at an elevated temperature ranging from about 450 to about 700° F. (residual heat from the hydrogenation reaction), the hydrogenation effluent stream, which is rich in hydrogen, thus reduces the catalyst to an active form for future use in the hydrogenation processing cycle. The hydrogenation reaction is completed in a relatively shallow depth of active catalyst. As the hydrogenation reaction zone moves through the processing or active bed, sufficient time is thus allowed for a more complete reduction of the oxidized or inactive bed without further expense or equipment to furnish a special reducing stream for transfer of same to the reactor being reduced. When breakthrough of unreacted hydrogenatable material occurs from the processing bed (indicating that the processing bed has been spent and is no longer active), the bed in the tail position, having been reduced, becomes the processing bed through which the hydrogenation reaction proceeds. The spent catalyst in the first reactor can then be replaced and activated with hydrogenation effluent from the second reactor (which is now the processing zone).

According to another embodiment of the invention, a single reactor containing an active reduced bed of catalyst at the inlet end of the reactor and filled in the remainder of the reactor with unreduced catalyst is provided for carrying out the present process. The activated bed of hydrogenation catalyst is so sized as to provide sufficient hydrogenation products to activate the unreduced bed of hydrogenation catalyst. The hydrogenation feed together with excess hydrogen is passed over the activated bed which initiates the hydrogenation reaction. This zone or bed will hydrogenate the hydrogenatable material in the feed and furnish hydrogen rich reaction products which in combination with the exothermic reaction temperature cause reaction of the oxidized or unreduced catalyst bed and activate this catalyst ahead of the reaction zone as it moves progressively through the reactor and catalyst bed.

Catalysts that can be activated or reduced according to the invention can be any of the well known metal hydrogenation catalysts, either supported or unsupported. However, nickel-kieselguhr catalysts are preferred since they are quite active for the hydrogenation of aromatic hydrocarbons, especially benzene. Other active hydrogenation catalysts that can be reduced according to the invention include Raney nickel, platinum, tungsten, molybdenum, palladium, chromium oxide, copper chromite, and the like. These materials are generally finely divided and are on a porous support such as precipitated alumina, alumina-silica coprecipitate, kieselguhr, and the like.

Catalysts that can be activated according to the invention are well known and methods for their preparation are also well known. The nickel-kieselguhr catalysts, which are preferred for the hydrogenation of benzene, can be prepared by saturating kieselguhr with a reducible metal compound such as nickel hydroxide after which at least a portion of the nickel compound in the mixture is reduced to elemental nickel by contacting same with a hydrogen-containing atmosphere according to the invention. As indicated above, the activation temperature ordinarily ranges from about 450 to 700° F., or higher, for these catalysts. The nickel-kieselguhr catalysts activated as hereinbefore described are in a state of high activity because such treatment reduces at least a part of the nickel compound to elemental nickel, generally 35 to 40 percent of the nickel being reduced, the reduced nickel content, however, sometimes varying from approximately 10 to 50 percent.

This invention is applicable broadly to hydrogenation of unsaturated organic compounds such as vegetable oils, fatty oils, and hydrocarbons. The invention is particularly applicable to hydrogenation of hydrocarbons boiling in the gasoline boiling range. In general, such hydrocarbons will be olefins of 4 to 30 carbon atoms per molecule and mononuclear aromatics containing up to 36 carbon atoms with up to 6 carbon atoms in any nuclear substituent. Examples of such hydrocarbons include butene, isobutylene, butadiene, pentene-1, pentene-2, 2-methylpentene-1, 4-ethyloctene-1, nonene-3, tricontene-1, benzene, paraxylene, metaxylene, orthoxylene, toluene, 2-hexylbenzene, 1,2,3,4,5,6-hexapentyl benzene, 1,3,5-trimethylbenzene, styrene, and the like. Other materials which can be hydrogenated according to the invention include polynuclear aromatics, such as biphenyls, naphthalenes, and the like, heterocyclic compounds such as pyridines and quinolines, etc.

Ordinarily, the hydrogenation reaction is carried out at a temperature in the range 200 to 600° F. and a pressure ranging from 300 to 600 p.s.i.g. However, the reaction temperature employed will vary considerably depending upon the particular reactant to be hydrogenated. For example, when benzene is hydrogenated to cyclohexane in the presence of a nickel catalyst, it is preferred that the hydrogenation be carried out at a temperature ranging from about 380° F. to about 500° F.

A better understanding of the invention will be obtained upon reference to the accompanying drawings which schematically illustrate two embodiments of the invention.

Referring now in detail to FIGURE 1, the system shown essentially comprises a reactor 10 containing a bed of activated metal hydrogenation catalyst, a reactor 20 containing a bed of metal hydrogenation catalyst to be reduced, and the associated interconnecting piping between the two reactors. An aromatic-containing hydrogenation feed stream containing added hydrogen, for example a benzene-containing hydrocarbon stream, which has been heated to the desired hydrogenation temperature, is introduced into the top of reactor 10 by way of lines 11 and 12.

Reactor 10 contains a bed of active hydrogenation catalyst, for example, a nickel-kieselguhr catalyst. The hydrogenation feed is passed through reactor 10 in contact with the catalyst bed under hydrogenation conditions to hydrogenate the hydrogenatable material, for example the hydrogenation of benzene to cyclohexane. Since the hydrogenation reaction is exothermic the reaction products withdrawn from the base of reactor 10 will be at a higher temperature than the feed introduced into the top of reactor 10. For example, when benzene is hydrogenated to cyclohexane each percent of benzene in the feed causes a temperature rise of about 20° F. across the reactor. The hydrogenation effluent products removed from reactor 10 containing hydrogen, hydrocarbons, and inerts (no steam) is passed by way of lines 13, 15, 16, 17 and 18 and introduced into the top of reactor 20.

The temperature of the hydrogenation zone effluent removed from reactor 10, which contains reduced metal hydrogenation catalyst, ordinarily ranges from about 450 to about 700° F. If the hydrogenation zone effluent contains demethylizable hydrocarbons, it is desirable to maintain the temperature of this stream not appreciably above 500° F. for introduction into reactor 20 since demethylation takes place at temperatures above about 500° F. and is an exothermic reaction. Therefore, cooling of the hydrogenation effluent may be desirable in some instances. The hydrogenation zone effluent stream rich in hydrogen and at an elevated temperature is passed through the unreduced metal hydrogenation catalyst bed in reactor 20 until the catalyst bed is activated, i.e. oxygen and other compounds of the metal are reduced to elemental metal. The hydrogenation zone effluent is removed from the outlet end of reactor 20 by way of line 21 and 22 and passed to further processing, e.g. recovery of hydrogenated material. The hydrogenation effluent can be passed through the reactor 20 until the catalyst in reactor 10 is deactivated and then reactor 20 becomes the processing reactor. If desired, the hydrogenation effluent can be passed to further recovery by way of line 14 and not passed through reactor 20 after the catalyst bed in reactor 20 has been activated.

After the catalyst in reactor 10 has been spent and is no longer active for hydrogenation, the hydrogenation feed is passed to reactor 20 by way of lines 11 and 19 and processing continued in reactor 20. The spent catalyst in reactor 10 can be removed and replaced with oxidized or inactive hydrogenation catalyst. After reactor 10 has been charged with oxidized catalyst it is reduced by utilizing the hydrogenation effluent from reactor 20 by passing same through lines 21, 23, 16, 24 and 12 and introducing same into the top of reactor 10. The hydrogenation effluent from reactor 20 is passed through the bed of catalyst in reactor 10 until the catalyst is activated. The hydrogenation effluent is withdrawn from reactor 10 for further processing through lines 13 and 14. Again, the hydrogenation effluent from reactor 20 need not be passed through reactor 10 after the catalyst has been activated, but can be withdrawn through lines 21 and 22 for further processing as described above.

Figure 2:
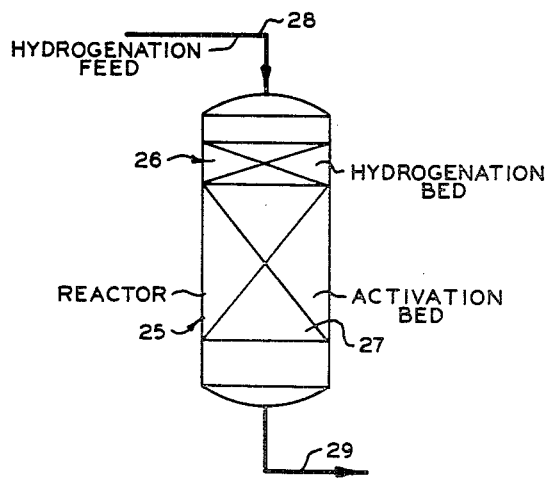

FIGURE 2 illustrates another method of carrying out the invention. Since the hydrogenation reaction occurs zonewise in the active catalyst bed, FIGURE 2 illustrates an embodiment wherein reactor 25 contains a major proportion of unused oxidized catalyst bed 27 and a smaller active catalyst bed 26 on top of the unused bed. The hydrogenation feed is introduced into the top of reactor 25 by way of 28 and the effluent is removed from the base of reactor 25 by way of line 29. Sufficient activated catalyst is placed on top of bed 27 to furnish the initiating reaction zone. Zone 26 will hydrogenate the hydrogenatable material, for example benzene, and furnish the hydrogen-rich reaction products which in combination with the exothermic reaction temperature cause reduction of the lower oxidized bed 27. Catalyst bed 27 is activated ahead of the reaction zone as it moves progressively through the catalyst beds. The reaction zone will continue moving downwardly through both zones 26 and 27 until all of the catalyst is spent. When desired, two similar reactors provided with two catalyst beds can be arranged in parallel so that the hydrogenation reaction can be carried out continuously, one being recharged or on standby while the other is processing and activating.

A more comprehensive understanding of the invention can be obtained by referring to the following illustrative example which is not intended, however, to be unduly limitative of the invention.

*Specific Example*

The following example will be described utilizing a reactor containing two catalyst beds as shown in FIGURE 2 described above. In the upper portion of the reactor there was placed 255.1 grams of a prereduced nickel-kieselguhr catalyst. In the lower portion of the reactor was placed 255.1 grams of an unreduced nickel-kieselguhr catalyst. A hydrogenation feed having an API gravity of 71.4 and a Reid vapor pressure of 5.2 and having the following composition was passed over the two catalyst beds, first over the prereduced catalyst and then over the unreduced catalyst.

|  | Vol. percent |
|---|---|
| 2-methylpentane | 6.75 |
| 3-methylpentane | 9.98 |
| n-hexane | 54.0 |
| Methylcyclopentane | 21.6 |
| Cyclohexane | 3.0 |
| Benzene | 4.6 |
| Total sulfur, percent by weight | 0.012 |

The above hydrogenation feed was passed over the catalyst beds at a feed rate of 2.25 LHSV, an inlet temperature of 460° F., for 560 hours. A 9:1 mol ratio of hydrogen to benzene was employed for this run. The expected life of the catalyst was found to be 10.3 barrels of feed per pound of catalyst.

For comparative purposes, 238.3 grams of an unreduced nickel-kieselguhr catalyst, in the oxidized state, was placed in the reactor and reduced with pure hydrogen at 450 p.s.i.g. and 650° F., for 24 hours. The hydrogenation feed employed in the above run was passed over the catalyst for 200 hours at 450 p.s.i.g., and 460° F. The feed rate was 2.25 LHSV and a mol ratio of 9:1 hydrogen to benzene was employed. The expected life for the catalyst, activated according to this procedure, was found to be 5.2 barrels of feed per pound of catalyst. A similar test conducted on another sample of the same batch of catalyst under the same conditions, again indicated a catalyst life of 5.2 barrels of feed per pound of catalyst.

In retrospect, the same catalyst, as employed in commercial operation, when reduced with hydrogen which has been diluted with steam for temperature control, processes the above described hydrogenation feed with an average catalyst life expectancy of from 5.0 to 5.7 barrels of feed per pound of catalyst.

In similar tests to those shown above, removal of sulfur from the feed sample to a level of 0.0004% by weight by treatment of the feed with sulfuric acid or hydrofluoric acid in combination with catalyst which had been reduced by hydrogen without steam, extended the catalyst life to 5 to 7 times that experienced in commercial operation.

It can be seen from the above comparative examples that catalysts activated according to the invention have a longer catalyst life than catalysts activated with different hydrogen-containing streams. Also, activation according to the invention can be conducted without the addition of steam which is normally used by the prior art methods.

It will be evident to those skilled in the art that many variations and modifications can be practiced upon consideration of the foregoing disclosure. Such variations and modifications are believed to be within the spirit and scope of the present invention.

I claim:

1. In a process for the catalytic hydrogenation of a hydrogenatable material under hydrogenation conditions, and recovering hydrogenated materials as product from the hydrogenation effluent from said hydrogenation, the improvement which comprises passing said effluent at a temperature not exceeding about 700° F., prior to said recovery, through a bed of unreduced metal oxide until oxide and other compounds of the metal are reduced to the elemental metal, thus activating said catalyst and making same available for the hydrogenation of hydrogenatable materials.

2. In a process for the catalytic hydrogenation of a hydrogenatable material and the activation of an unreduced metal hydrogenation catalyst, the steps, in combination, which comprise passing said hydrogenatable material and hydrogen under hydrogenation conditions through a first zone containing a bed of activated hydrogenation catalyst to hydrogenate said material, passing the hydrogenation effluent thus obtained at a temperature not exceeding about 700° F. through a second zone containing a bed of unreduced metal oxide and therein contacting said unreduced metal until oxide and other compounds of the metal are reduced to elemental metal, thus activating said unreduced catalyst bed and making same available for the hydrogenation of hydrogenatable materials, and then recovering from said effluent the hydrogenated material as a product of the process.

3. A process for hydrogenating a stream containing a hydrogenatable material and hydrogen which comprises passing said stream under hydrogenation conditions into contact with a bed composed of the following solid catalysts in contiguous juxta-position in the line of flow, an activated supported metal hydrogenation catalyst and an unreduced supported metal oxide so as to hydrogenate said hydrogenatable material upon contacting said activated catalyst and activate said unreduced metal oxide by contacting with hydrogenated products, thereby converting oxide and other compounds of the metal to elemental metal, continuing hydrogenation until said bed is inactive for hydrogenation, and recovering said hydrogenation products from the effluent of said bed.

4. A process for hydrogenating a benzene-containing stream containing hydrogenatable materials which comprises passing said stream at a temperature in the range 450 to 700° F. in the presence of added excess hydrogen in contact with an activated nickel-kieselguhr hydrogenation catalyst and then, without intermediate treatment, into contact with an unreduced nickel-kieselguhr hydrogenation catalyst until oxide and other compounds of said metal are reduced to elemental metal, thus hydrogenating said hydrogenatable material and activating said unreduced catalyst and making same available for hydrogenation.

5. A process for the activation of an unreduced metal oxide used after reduction for the hydrogenation of reaction mixtures comprising hydrogenatable materials and hydrogen which comprises contacting said metal oxide with the hydrogen-rich effluent from said hydrogenation at a temperature not substantially exceeding the temperature employed in the hydrogenation reaction.

6. A process for hydrogenating aromatic hydrocarbons which comprises contacting an aromatic hydrocarbon-containing stream under hydrogenation conditions including a temperature in the range of 200 to 600° F. with a metal hydrogenation catalyst, said catalyst having been activated by heating at a temperature in the range 450 to 700° F. with a hydrogen-rich effluent removed directly from a catalytic hydrogenation reaction.

7. A process according to claim 6 wherein said stream is a benzene-containing stream and said catalyst is a nickel-kieselguhr catalyst.

References Cited in the file of this patent

UNITED STATES PATENTS

| 2,428,692 | Voorhies | Oct. 7, 1947 |
| 2,866,750 | Mosesman | Dec. 30, 1958 |